United States Patent [19]

Hasegawa et al.

[11] Patent Number: 4,737,812
[45] Date of Patent: Apr. 12, 1988

[54] AUTOMATIC FOCUSING CAMERA

[75] Inventors: Hiroshi Hasegawa, Tokyo; Takashi Saegusa, Kawasaki, both of Japan

[73] Assignee: Nippon Kogaku K.K., Tokyo, Japan

[21] Appl. No.: 890,329

[22] Filed: Jul. 29, 1986

[30] Foreign Application Priority Data

Aug. 5, 1985 [JP] Japan .................................. 60-172136
Mar. 21, 1986 [JP] Japan .................................... 61-63080

[51] Int. Cl.$^4$ ............................................. G03B 3/00
[52] U.S. Cl. ..................................... 354/400; 354/286
[58] Field of Search ....................... 354/400, 286, 402

[56] References Cited

U.S. PATENT DOCUMENTS

| 4,323,303 | 4/1982 | Enomoto | 354/286 |
| 4,443,085 | 4/1984 | Tomori et al. | 354/286 |
| 4,482,235 | 11/1984 | Yasukawa et al. | 354/402 |
| 4,483,603 | 11/1984 | Metabi et al. | 354/286 |
| 4,496,229 | 1/1985 | Ogasawara | 354/286 |
| 4,508,443 | 4/1985 | Matsuzaki et al. | 354/286 |
| 4,540,262 | 9/1985 | Nukai et al. | 354/286 |
| 4,613,224 | 9/1986 | Ogasawara | 354/286 |

Primary Examiner—Russell E. Adams
Attorney, Agent, or Firm—Shapiro and Shapiro

[57] ABSTRACT

A camera body is constructed in a manner that two different types of AF lenses can be detachably attached thereto and the camera body can properly operate these types of AF lenses.

The camera body detects the type of the attached one of the AF lenses and generates a corresponding detection signal according to a detection result.

In addition, the camera body is designed to selectively generate at least two different voltages according to the detection result.

20 Claims, 11 Drawing Sheets

AUTOMATIC FOCUSING CAMERA

BACKGROUND OF THE INVENTION

1. Field of the Invention

The present invention relates to a camera to which an automatic focusing lens barrel (to be referred to as an AF lens hereinafter) can be detachably attached.

2. Related Background Art

In automatic focusing single-lens reflex cameras, an AF lens is controlled and set in an in-focus state in response to a signal from the camera body.

Conventional single-lens reflex cameras of this type are classified into a camera having a driving device such as a motor arranged in an AF lens so as to drive the lens into an in-focus state and a camera having the driving device in the camera body.

SUMMARY OF THE INVENTION

It is an object of the present invention to provide a camera body to which two different types of AF lenses can be detachably attached and which can properly operate these types of AF lenses.

It is another object of the present invention to provide an AF lens having a means for inhibiting an AF lens CPU from failure, the AF lens being operative upon application of a voltage from a camera body.

Two different AF lenses can be detachably attached to the camera body according to the present invention, and the camera body detects the type of the attached one of the AF lenses and generates a corresponding detection signal according to a detection result.

In addition, the camera body according to the present invention is designed to selectively generate at least two different voltages according to the detection result.

The AF lens according to the present invention is designed to detect a voltage applied from the camera body and causes the AF lens CPU to start according to the detection result.

DETAILED DESCRIPTION OF THE PREFERRED EMBODIMENTS

Figure 1:
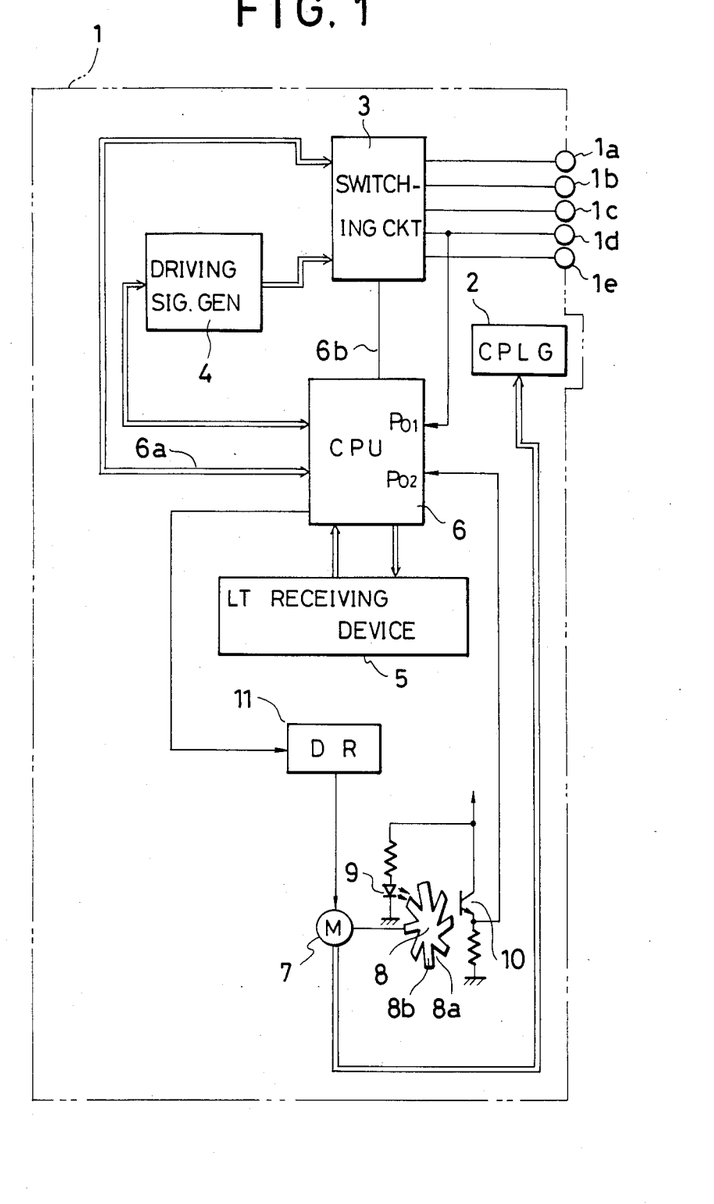
FIG. 1 is a block diagram showing an embodiment of a camera body according to the present invention.
Figure 2A:
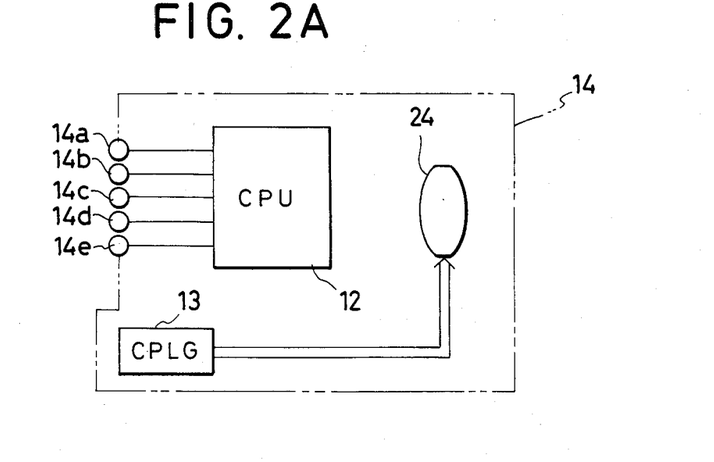
FIGS. 2A and 2B are respectively block diagrams showing AF lenses associated with the camera body of the present invention.
Figure 2B:
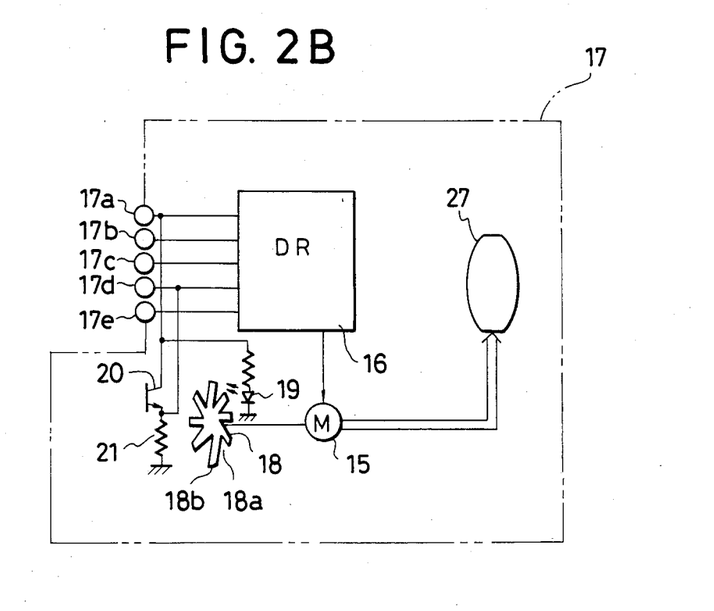

A first AF lens 17 in FIG. 2B or a second AF lens 14 in FIG. 2A can be detachably attached to a single-lens reflex camera body 1 in FIG. 1.

The camera body 1 in FIG. 1 includes a power supply terminal 1a, signal transfer terminals 1b to 1d, and a ground terminal 1e, all of which are arranged on the surface of the mount to which an AF lens is detachably mounted. A coupling 2 is rotated by a motor in a camera body (to be described later) and extends from the surface of the mount. A switching circuit 3 switches an output voltage to the terminal 1a and signals transmitted to the signal transfer terminals 1b to 1d. A driving signal generator 4 supplies a motor driving signal to the first AF lens 17. A light receiving device 5 receives light through an optical system in an AF lens attached to the camera body 1 so as to control focusing. The light receiving device 5 comprises a pair of one-dimensional image sensors and generates a photoelectric signal in response to the driving signal from a CPU 6. The CPU 6 discriminates whether the lens attached to the camera body 1 is the first or second AF lens 17 or 14, identifies a focusing control state of the lens upon reception of a signal from the light receiving, device 5, and outputs a signal for driving a motor 7 of a driving device 11. A rotary disk 8 is rotated together with the motor 7 and has light transmitting and blocking portions 8a and 8b. Light emitted from the light emitting element 9 is incident on a light receiving element 10 through the rotary disk 8. The second AF lens 14 comprises a CPU 12, a coupling 13 adapted to be engaged with the coupling 2, and terminals 14a to 14e adapted to be connected to the terminals 1a to 1e. These components are arranged on the surface of the lens mount. When power is supplied from the camera body 1 through the terminals 14a and 14e, the CPU 12 outputs data associated with the relationship between a displacement of a focusing lens element in the AF lens 14 upon one revolution of the coupling 13 and an image plane displacement of the object image upon movement of the lens element (the data, such as focal length data and minimum F-number data, inherent to interchangeable lenses). The data appears at the terminals 14b to 14d. The terminal 14d is open when the lens 14 is attached to the body 1, i.e., before the CPU 6 communicates with the CPU 12. The AF lens 17 comprises a motor 15 in a lens barrel described in U.S. Pat. No. 4,482,235, a motor driving circuit (DR) 16, and terminals 17a to 17e respectively connected to the terminals 1a to 1e (the terminal corresponding to the terminal 17a is not described in the above U.S. Patent.) The terminals 17a to 17e are arranged on the surface of the mount of the lens barrel. The motor driving circuit 16 receives power from the camera body 1 through the terminals 17a and 17e and a motor driving signal through the terminals 17b to 17d so as to control the motor 15. Upon rotation of the motor 15, a focusing lens element in the lens 17 is driven. A rotary disk 18 is rotated together with the motor 15. The rotary disk 18 and elements 19 and 20 have the same arrangement as those of the components 8, 9 and 10 in the camera body 1. The AF lens 17 is controlled such that the displacement of the image plane upon movement of the lens element and the number of revolutions of the motor 15 satisfy a predetermined relationship. The terminal 17d in the AF lens 17 is grounded through a resistor 21. A low-level (to be referred to as a L level hereinafter) signal is supplied from the terminal 17d to the camera body 1 when the lens 17 is attached to the camera body 1 (before the motor 15 is driven). Manual focusing lenses may not have terminals to be connected to the camera body terminals 1a to 1e. In this case, a manual operation ring (i.e., a focusing ring) is manually turned to shift the focusing lens element.

The lens identification operation and the subsequent operation will be described with reference to FIG. 3.

(i) When Lens 14 Is Attached To Body 1:

When the lens 14 is attahced to the camera body 1, a signal (open) of the terminal 14d is input to a port P01 of the CPU 6 through the terminal 1d. In step 100, the CPU 6 checks whether a signal applied to the port P01 is of L level. Since the terminal 14d is kept open, the signal input to the port P01 is of high level (to be referred to as an H level hereinafter). The flow advances to step 101. In step 101, the CPU 6 outputs a signal to a switching circuit 3 through a line 6b to set the terminal 1a at 5 V. In step 102, the CPU 6 outputs an interrogation signal to the terminals 1b to 1d through the switching circuit 3 to determine whether the CPU 6 can communicate with a corresponding CPU. In this case, the lens 14 is attached to the camera body 1 so that the CPU 6 can communicate with the CPU 12. The CPU 12 sends out a response signal from the terminals 14b to 14d. This signal is transferred to the CPU 6 through the terminals 1b to 1d, the switching circuit 3, and a data bus 6a. The CPU 6 determines in step 103 whether the response signal from the lens 14 is received through the data bus 6a. Upon detection of the response signal, the CPU 6 determines that the lens 14 is attached to the camera body 1. The flow advances to step 104. In step 104, data associated with the relationship between the displacement of the focusing lens element and the displacement of the image plane is read out from the internal memory of the CPU 12 and is written in the internal memory of the CPU 6 through the terminals 14b to 14d, the terminals 1b to 1d, the switching circuit 3, and the data bus 6a. Thereafter, this data is used for automatic focusing control.

The operation of automatic focusing control will be described hereinafter. Light from the object is guided to the light receiving device 5 through an optical system in the AF lens 14. The light receiving device 5 outputs a photoelectric output corresponding to a focusing state. The CPU 6 receives the photoelectric output and discriminates the focusing control state. More specifically, the CPU 6 determines an actual deviation between the film surface and the image plane of the object image, a near-focus state, and a far-focus state. The CPU 6 calculates the number of revolutions of the motor 7 to cancel the deviation (i.e., obtain the just-in-focus state) according to the deviation between the film surface and the image plane as well as the data associated with the relationship between the displacement of the lens and the displacement of the image plane and supplied from the CPU 12. The motor 7 is driven in a given rotational direction in response to a near- or far-focus state signal from the CPU 6. The CPU 6 counts, through a port P02, the number of pulses appearing at the emitter of the light receiving element (phototransistor) 10 and determines whether the number of revolutions reaches a predetermined value. If so, the motor 7 is stopped, thereby obtaining an in-focus state.

(ii) When Lens 17 Is Attached To Body 1:

When the AF lens 17 is attached to the camera body 1, an L level signal at the terminal 17d is input to the port P01 of the CPU 6 through the terminal 1d. The flow jumps from step 100 to step 105. In step 105, the CPU 6 sends a signal to the switching circuit 3 through a line 6b to instruct a change of an output voltage Vcc switching circuit 3 from 5 V to 3 V. The switching circuit 3 switches the output voltage Vcc to 3 V. A voltage of 3 V appears at the terminal 1a.

The automatic focusing control operation will be described below. As in the case (i), the CPU 6 determines the focusing control state according to the output from the light receiving device 5. However, unlike in the case (i), the CPU 6 does not drive the motor 7, the rotary disk 8, and the elements 9 and 10. The CPU 6 outputs only the near-or far-focus signal. This output signal is supplied to the driving signal generator 4. The driving signal generator 4 converts the signal from the CPU 6 to a signal for driving the motor 15. The converted signal appears at the terminals 1b to 1d through the switching circuit 3. More specifically, when the switching circuit 3 receives a switching signal 6b of the power source voltage Vcc from the CPU 6, the switching circuit 3 causes the CPU 6 to interrupt communication with the CPU 12. The signal from the driving signal circuit 4 appears at the terminals 1b to 1d. The motor driving circuit 16 receives the signal from the driving signal circuit 4 and drives the motor 15. The motor 15 drives the focusing lens element so that it is displaced along its optical axis. The image plane is displaced to coincide with the film surface. When the rotary plate 18 is rotated upon rotation of the motor 15, pulses appear at the emitter of the light receiving element (phototransistor) 20. This pulse output is transferred to the port P01 of the CPU 6 through the terminals 17d and 1d. Since the number of revolutions of the motor 15 has a predetermined relationship with the displacement of the image plane, the relationship between the pulse output and the displacement of the image plane is the same as the predetermined relationship. When the CPU 6 outputs the near- or far-focus signal to the driving signal generator 4, the CPU 6 also calculates the actual deviation of the image plane relative to the film surface, as previously mentioned. The CPU 6 calculates the number of pulses input to the port P01 to calculate a displacement of the image plane and determines whether the displacement of the image plane coincides with the actual deviation. If a coincidence is determined, the CPU 6 supplies a signal to the driving signal generator 4. The motor 15 is stopped, and the in-focus state is obtained.

(iii) When Non-AF Lens Is Attached To Body 1

When a non-AF lens (manual focusing lens) is attached to the body 1, the CPU 6 attempts to read a lens output through the terminal 1d. However, the manual focusing lens does not have this terminal The terminal 1d is kept open, as in the lens 14. Therefore, the flow advances to step 102 through step 101. Since the non-AF lens does not have a CPU, no response signal is sent back. The flow advances to step 106. The CPU 6 sends a signal to the switching circuit 3 through the line 6b to designate that the output voltage Vcc at the switching circuit 3 is set to zero. In other words, the power is cut off.

Focusing control is then performed by the operator using the manual focusing ring mounted on the non-AF lens. The CPU 6 need not output signals for communicating with the CPU 12 or driving the motor 15. The switching circuit 3 is held in a disabled state where all signals to be transmitted to the terminals 1a to 1e are blocked.

In this embodiment, the coupling 2 may extend from the mount surface of the camera body 1, upon detecting that the lens 14 is attached to the camera body 1.

In the above embodiment, the motor driving signal is output from the terminals 1b to 1d upon attachment of the lens 17 to the camera body 1. However, as is apparent from the above embodiment, the motor driving signal appears at the terminals 1b and 1c, and a pulse output from the lens is input to the terminal 1d.

Figure 4:
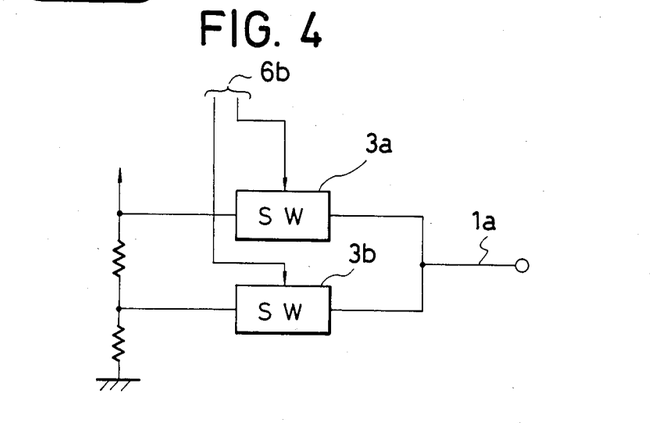
FIG. 4 is a block diagram showing part of the embodiment of the camera body according to the present invention.

The switching circuit 3 comprises a plurality of gates and switches which are controlled in response to a switching signal on line 6b from the CPU 6. The arrangement of the switching circuit 3 which corresponds to the terminal 1a is illustrated in FIG. 4. Two power source voltage dividing resistors are connected to the terminal 1a through switches 3a and 3b. The switches 3a and 3b are turned on/off in response to the switching signal on line 6b.

Figure 5:
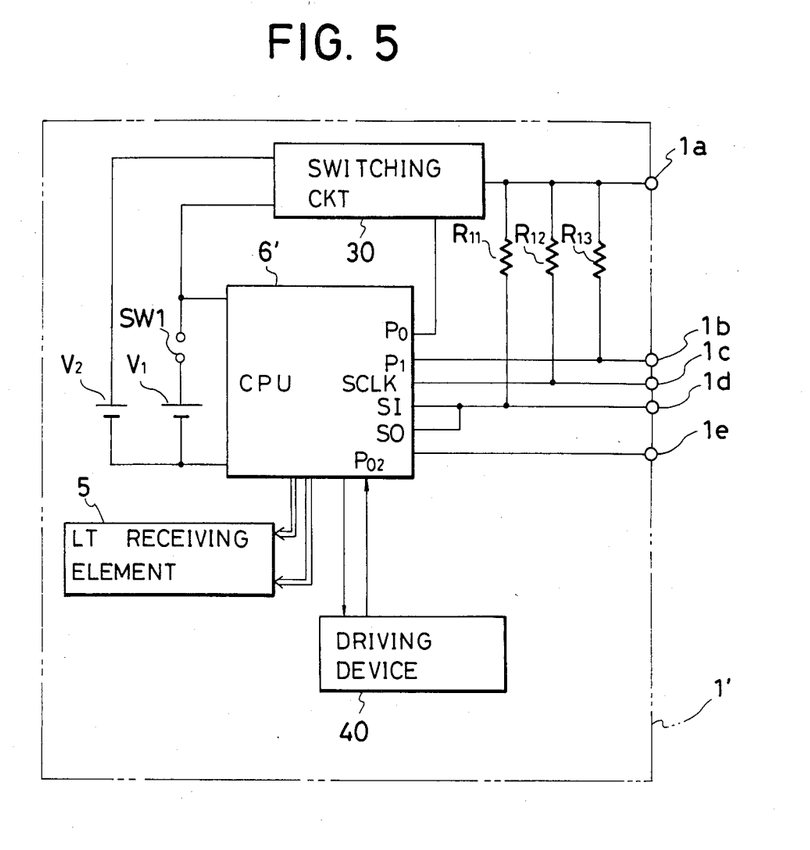
FIG. 5 is a block diagram showing an improved modification of the camera body according to the present invention.
Figure 6:
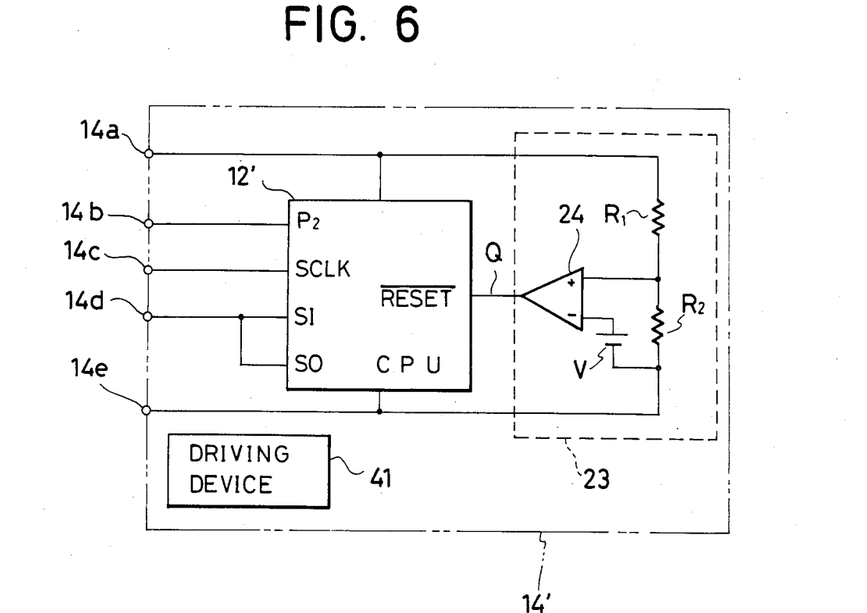
FIG. 6 is a block diagram showing an embodiment of the AF lens according to the present invention.

An improved arrangement of the embodiment of the present invention will be described with reference to FIGS. 5 and 6. Referring to FIG. 5, a CPU 6' is directly connected to terminals 1b, 1c, and 1d, and a switching circuit 30 switches a voltage applied to the lens. Power sources V1 and V2 are illustrated but may be provided by dividing a voltage from a single power source. A driving device 40 is constituted by the driver 11, the motor 7, the rotary disk 8, the light emitting element 9, the light receiving element 10, a plurality of resistors, and the coupling 2 in FIG. 1. Referring to FIG. 6, a CPU 12' has a terminal $\overline{\text{RESET}}$ for receiving an output from a voltage detecting means 23 consisting of resistors R1 and R2, a constant voltage source Ve, and a comparator 24.

The CPU 6' includes an I/O terminal P1 for exchanging a serial signal with the CPU 12', a serial clock terminal SCLK for generating serial clock pulses, a serial input terminal SI, and a serial output terminal SO.

The CPU 6' includes a known serial interface function with an 8-bit I/O register. The serial input terminal SI and the serial output terminal SO are connected to a contact 1d. The contact 1d is connected to a contact 14d to constitute a bidirectional data line.

A contact 1c is connected to the serial clock terminal SCLK to constitute a serial clock line. The contact 1c is connected to a serial clock terminal SCLK of the CPU 12' through a contact 14c of a lens 14'. The contact 1b is connected to the I/O terminal P1 of the CPU 6' to constitute a handshaking signal line.

A contact 1e is grounded in the same manner as that in FIG. 1.

The CPU 12' has a function of an 8-bit serial interface, as in the CPU 6'. The serial input terminal SI and the serial output terminal SO of the CPU 12' are commonly connected to a contact 14d. A potential $\{R2/(R1+R2)\}Vcc$ obtained by dividing the first power source voltage V1 by the resistors R1 and R2 is input to the noninverting input terminal of the comparator 24. At the same time, the reference voltage V0 is input to the inverting input terminal of the comparator 24. If the power source voltage Vcc applied through the contact 14a of the AF lens 14' is set as follows:

$$\{R2/(R1+R2)\}Vcc < V0, \text{ i.e.,}$$
$$Vcc < \{(R1+R2)/R2\}V0$$

an output Q from the voltage detecting means 23 is set at low level. The reset terminal $\overline{\text{RESET}}$ of the CPU 12' goes low to reset the CPU 12' so that the CPU 12' is kept disabled.

However, if the power source voltage Vcc satisfies the following inequality:

$$\{R2/(R1+R2)\}Vcc \geq V0, \text{ i.e.,}$$
$$Vcc \geq \{(R1+R2)/R2\}V0$$

the output Q of the voltage detecting means 23 goes high. The reset terminal $\overline{\text{RESET}}$ of the CPU 12' goes high accordingly to cancel the reset state thereof. The CPU 12' starts the predetermined operations. It should be noted that $V0' = \{(R1+R2)/R2\}V0$ is given.

Figure 7:
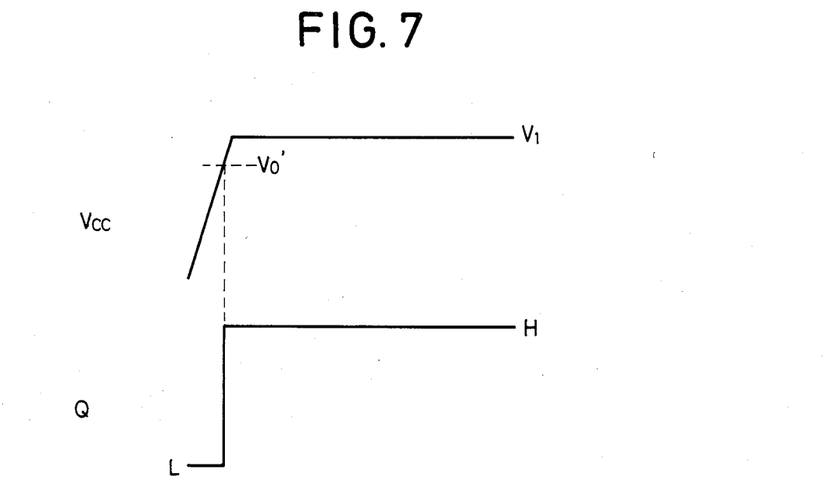
FIG. 7 is a timing chart for explaining the operation of the AF lens according to the present invention.

As shown in FIG. 7, the power source voltage Vcc reaches the first power source voltage at the camera body 1 with a short delay time at the energization of the camera system. The output Q goes high when the power source voltage Vcc reaches the voltage V0'. The reset state of the CPU 12' is cancelled, and the CPU 12' can start the predetermined operations. However, if the power source voltage Vcc sharply rises to shorten the resetting time of the CPU 12', a delaying means must be arranged in the voltage detecting means 23 to prevent the CPU 12' from failure.

The operation of the CPU 12' will be described with reference to FIG. 8.

Figure 8:
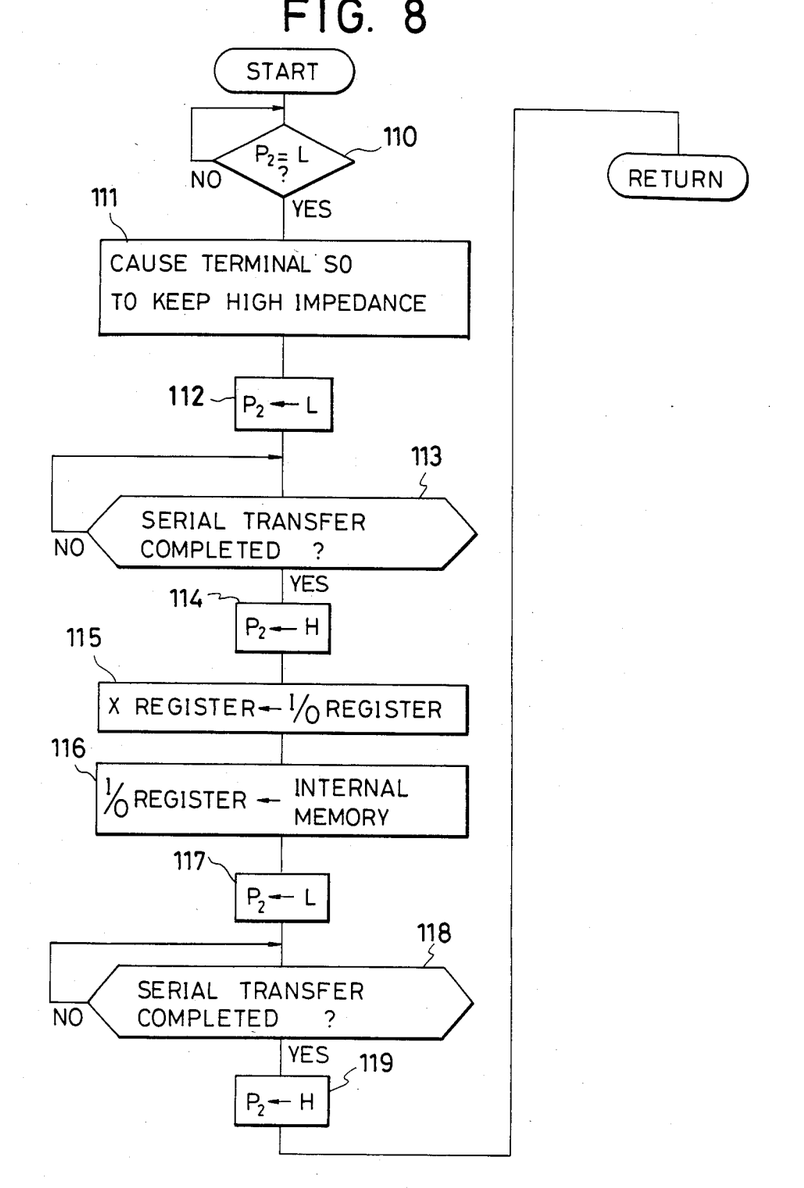
FIG. 8 is a flow chart for explaining the operation of an AF lens CPU shown in FIG. 6.

As shown in FIG. 8, in order to monitor an initialization instruction from the CPU 6' in the camera body 1, the I/O terminal P2 is set in the input state to determine in step 110 whether the input is set at L level. If YES in step 110, the flow advances to step 111. However, if NO in step 110, no initialization instruction for the CPU 12' is sent from the CPU 6'. The flow returns to step 111.

In step 111, the serial output terminal SO is kept at a high impedance to allow a pulse input of the serial clocks from the CPU 12'. In step 112, the I/O terminal P2 is set in the output mode, and an L output appears thereat, thus acknowledging to the CPU 6' that the CPU 12' is ready for response.

In the next step 113, the operations for receiving eight pulses from the CPU 6' are repeated. Upon reception of eight serial clock pulses, a serial flag is set, and the flow advances to step 114.

In step 114, in order to acknowledge that an instruction from the CPU 6' has been received, the CPU 12' outputs an H level output at the I/O terminal P2. In step 115, the 8-bit content of the serial input/output register is transferred to the X register in the CPU 12'.

In step 116, the data represented by the X register is transferred to the serial I/O register from the internal memory.

In step 117, an output of the I/O terminal P2 goes low to acknowledge to the CPU 6' that the data transfer preparation is completed.

In step 118, the operations up to setting of the serial flag are repeated, as in step 113. One-bit data of the serial I/O register is sent from the serial output terminal SO to the CPU 6' through the contacts 14d and 1d in synchronism with input of every 8 serial clock pulses to the serial clock terminal SCLK.

In step 119, the I/O terminal P2 is set at H level, and the flow returns to step 111. The CPU 12' waits for the next initialization instruction from the CPU 6'.

In step 116, the memory data designated by the content of the X register is transferred to the serial I/O register. The memory can store the following data at corresponding addresses. It should be noted that each data is in hexadecimal notation.

TABLE 1

| Address | Data | Content |
|---------|------|---------|
| 00 | 50 | Focal length |
| 01 | 00 | Spare area |
| 02 | 0C | Full-aperture value |
| 03 | 54 | Maximum number of stopped-down-aperture steps |
| 04 | 80 | Type of Lens |
| 05 | 1B | AF correction value (1) |
| 06 | 15 | AF correction value (2) |
| 07 | 20 | AF correction value (3) |

In table 1, data $50_{hex}$ representing a 50-mm F-1.4 lens is stored at address 00. Address 01 is a spare memory area for storing data $00_{hex}$. Data $0C_{hex}$ representing the full-aperture value or minimum F-value is sotred at address 02. Since the full-aperture value of the F-1.4 lens is AV=1, the value (AV=1) can be expressed at 12 steps for 1/12 EV steps. The value of $12_{decimal}$ is equal to $0C_{hex}$. If the maximum F-number is F 16 (AV 8), a maximum number of stopped-down-aperture steps is 7. The seven steps are expressed by the 1/12 EV steps to be 84 steps. The value $84_{decimal}$ is expressed as $54_{hex}$ stored at address 03. Data representing the type of lens is stored at address 04. Since the standard lens is used, the MSB of 8-bit is set at logic "1" so that data $80_{hex}$ is stored at address 04. AF correction values (1) to (3) are stored at addresses 05 to 07. Data can be additionally stored at address 08 and the subsequent addresses, but a detailed description thereof will be omitted.

Figure 9:
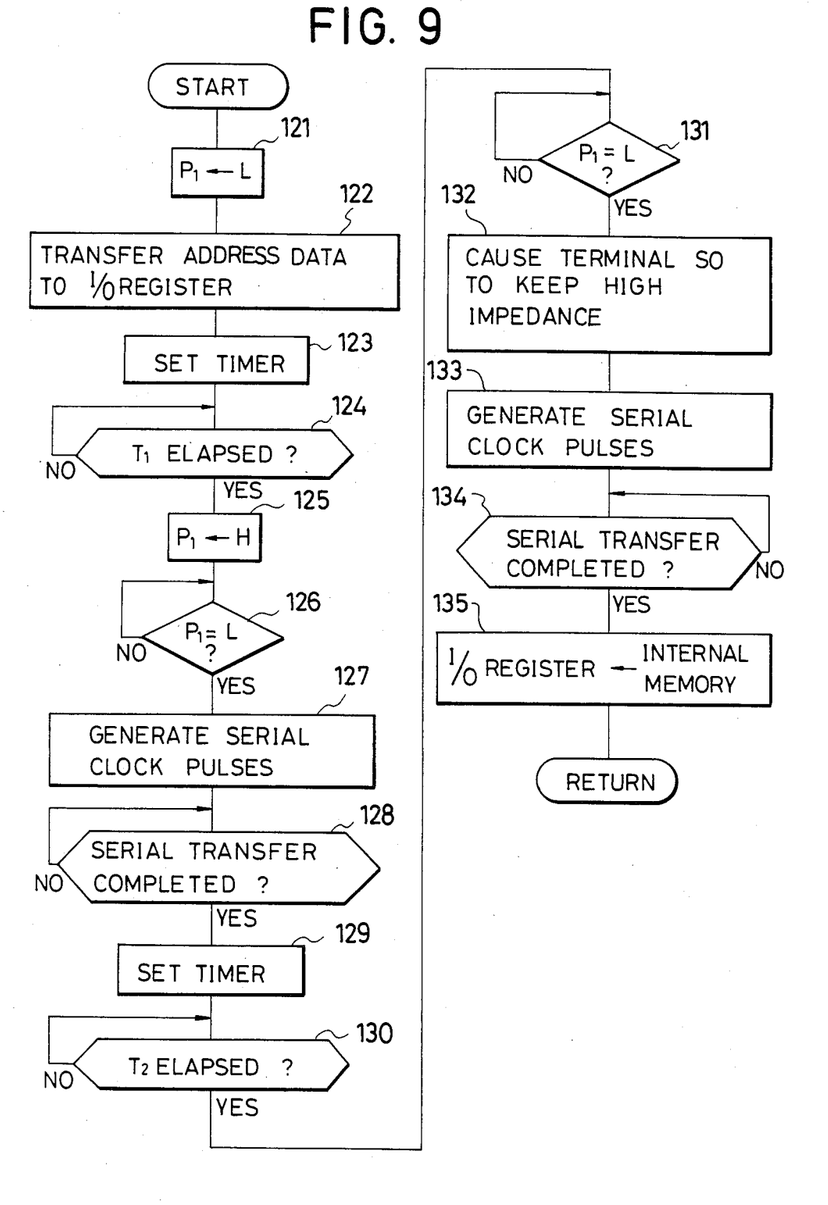
FIG. 9 is a flow chart for explaining the operation of a camera body circuit in FIG. 5.

As shown in FIG. 9, in step 121, the I/O terminal P1 is set in the output mode, and an L level output appears thereat to initialize the I/O terminal P2 of the CPU 12' in the AF lens 14' through the contacts 1b and 14b.

Address data designating the memory address of the CPU 12' which is determined by necessary data is transferred to the output register in the CPU 6' in step 122. For example, if the full-open aperture value is required, data is read out from the memory area at address 02 and transferred to the serial I/O register.

In step 123, a predetermined time T1 is set in the internal timer, and the timer is started. In step 124, the lapse of the time T1 is determined. If the time is determined to have elapsed, i.e., if YES in step 124, the flow advances to step 125. In step 125, the I/O terminal P1 goes high to set the input mode. The flow then advances to step 126.

Whether an input to the I/O terminal P1 is set at L level is determined in step 126. If the response preparation is completed in the CPU 12', the input to the I/O terminal P1 is set at L level. Otherwise, the terminal P1 is kept high. When the CPU 12' is set in the response enable mode and the output from the I/O terminal P2 is set at L level, these states are detected and the flow advances to step 127.

In step 127, the CPU 12' generates serial clock pulses at the serial clock terminal SCLK thereof. In response to this generation, the address data stored in the serial I/O register appears at the serial output terminal SO.

In step 128, the serial flag is monitored and the processing is repeated until 8-bit serial data transfer is completed. If the flag is set at logic "1", signifying that the serial transfer is completed, the flow advances to step 129.

In step 129, a predetermined time T2 is set in the internal timer, and the timer is started. The lapse of the predetermined time T2 is determined in step 130. If the time T2 is determined to have elapsed, i.e., if YES in step 130, the flow advances to step 131. During the predetermined time T2, the I/O terminal P2 goes high and is kept high.

Whether the terminal P1 is set at L level is determined in step 131. If data transfer preparation of the CPU 12' is completed, an L level signal is input to the I/O terminal P1. The flow then advances to step 132.

In step 132, the serial output terminal SO of the CPU 6' is kept at a high impedance. In step 133, the clock pulses appear at the serial clock terminal SCLK, and data of the lens 14' is input from the CPU 12' through the serial input terminal SI in synchronism with the clock pulse generation.

In step 134, the serial flag is monitored in the same manner as in step 128. When 8-bit serial transfer is completed, the flow advances to the next step.

The data from the serial I/O register is stored in a predetermined memory area to complete the subroutine. The flow returns to the main routine.

In the above operation, if the open-aperture value is required in the CPU 6', the address data at address 02 is transferred from the CPU 6', to the CPU 12'. If the attached lens is a 50-mm F-1.4 lens, data $0C_{hex}$ is returned from the CPU 12'. The CPU 12' performs exposure control and display operations or focusing control according to this data.

Figure 10:
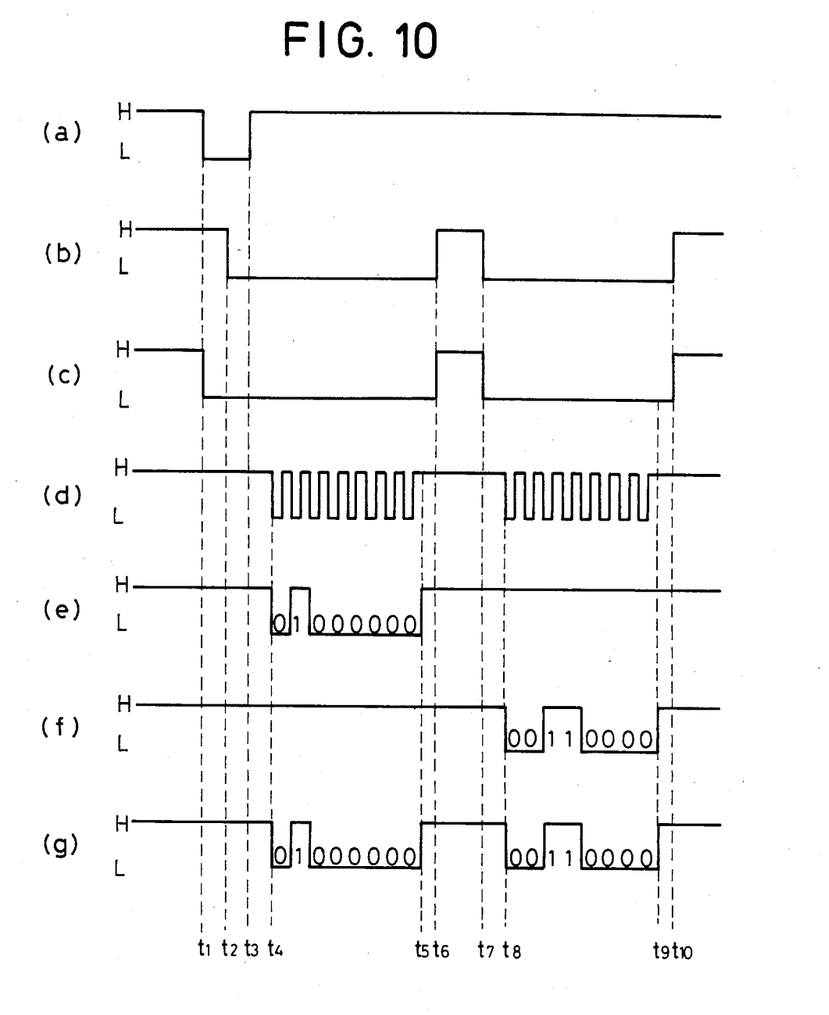
FIG. 10 is a timing chart for explaining the operations of the camera body in FIG. 5 and the AF lens in FIG. 6.

Referring to FIG. 10, an output waveform (a) appears at the I/O terminal P1 of the CPU 6'. A waveform (b) appears at the I/O terminal P2 of the CPU 12'. Each of the I/O terminals P1 and P2 is constituted by an open drain and a pull-up resistor When the I/O terminals P1 and P2 are connected through the contacts 1b and 14b and an output from one of the I/O terminals P1 and P2 is set at L level, a composite output is set at L level, thereby obtaining a waveform (c).

A waveform (d) of serial clock pulses appears at the serial clock terminal SCLK of the CPU 6'. If the contacts 1c and 14c are connected to each other, the serial clocks having the waveform (d) are input to the CPU 12'.

An output waveform (e) of address data appears at the serial output terminal SO of the CPU 6'. An output waveform (f) (data representing the minimum F-value of the lens) appears at the serial output terminal SO of the CPU 12'. If the serial output terminals SO of the both CPUs are connected to each other through the contacts 1d and 14d and one of the outputs from the output terminals SO is set at L level, a composite output is set at L level as indicated by a waveform (g), as in the waveform (c).

The flow charts of FIGS. 8 and 9 will be described according to the time sequence of FIG. 10.

In step 121, the CPU 6' sets the output at the I/O terminal P1 from H level to L level (t=t1). The CPU 12' detects the logical level change at the I/O terminal P2, and the flow advances from step 111 to step 112. The CPU 12' sets the output at the I/O terminal P2 from H level to L level (t=t2). When a predetermined period of time has elapsed, the CPU 6' sets the output from the I/O terminal P1 from L level to H level in step 125 (t=t3).

In this case, the waveform (c) is set at L level so that the I/O terminal P1 receives the L level signal. The flow for the CPU 6' advances from step 126 to step 127. In step 127, the CPU 6' generates serial clock pulses (t=t4). In synchronism with the generation of serial clock pulses, the address data having the waveform (e) appears at the serial output terminal SO of the CPU 6' bit by bit. For example, if the open-aperture value or minimum F-value is read out, the data is stored at address 02 so that the data appears at the serial output terminal SO of the CPU 6' bit by bit from the least significant bit (LSB) in response to the serial clock pulses.

In this case, the serial output terminal SO is set at the high impedance in step 111 so that the waveform (g) is given in the same manner as in the waveform (e) for a period from time t4 to time t5. The composite output having the waveform (g) is input to the serial input terminal SI of the AF lens 14'.

When eight serial clock pulses are input to the serial clock terminal SCLK of the CPU 12' (t=t5), transfer of this data to the serial input register of the CPU 12' is completed. The flow for the CPU 12' advances from step 113 to 114. When the output at the I/O terminal P2 is set from L level to the H level, the waveform (c) is changed from L level to H level (t=t6) accordingly.

The CPU 12' executes steps 115 and 116 and designates an address of the internal memory of the CPU 12' according to the data of the serial input register of the CPU 12'. The designated data is output to the serial input register. When data transfer preparation is completed in step 117, the CPU 6' updates the output at the I/O terminal P2 from H level to L level (t=t7).

When the I/O terminal P1 of the CPU 6' goes low, the flow for the CPU 6' advances from step 131 to step 132, and the CPU 6' generates serial clock pulses again (t=t8). The data representing the full-aperture value is output from the serial output terminal SO of the CPU 12' bit by bit in response to the serial clock pulses.

When address 02 in table 1 is accessed, the designated data is 0C$_{hex}$. The output having the waveform (f) at the serial output terminal SO of the CPU 12' is generated from the LSB for a period between times t8 and t9. In this case, since the serial output terminal SO of the CPU 6' is set at high impedance in step 132, the waveform (g) is changed in the same manner as in the output waveform (f) and is input to the serial input terminal SI of the CPU 6'.

When eight serial clock pulses are input to the serial clock terminal SCLK of the CPU 12'(t=t9), data transfer to the serial input register of the CPU 6', i.e., transfer of the data representing the full-aperture value is completed.

The data representing the full-aperture value is stored in a memory in step 135, and the subroutine of the CPU 6' is completed. The CPU 12' changes the logical state of the I/O terminal P2 from L level to H level in step 119 (t =t10), and the flow returns to step 110. The CPU 12' waits for the next instruction.

Since the terminals P1, SCLK, SI and SO of the CPU 6' are pulled up by pull-up resistors R11 to R13 to the power source voltage V1 or V2 supplied from the switching circuit 30 to the AF lens, the signal supplied to the AF lens does not exceed the power source voltage applied to the contact 1a.

If the AF lens 17 is attached to the camera body 1, the input and output states at the terminals 1a, 1b, 1c, 1d, and 1e under the control of the CPU 6' are the same as in FIG. 1, and the switching circuit 30 selects the second power source voltage V2 as the power source voltage in response to the output from the terminal PO of the CPU 6'. The second power source voltage V2 is applied to the contact 1a.

In this case, the CPU 6' generates a near- or far-focus signal, and the driver 16 controls the rotational direction of the lens and drives a lens element 27, thereby performing focusing control. When the lens element 27 is driven, the focusing state is changed. The CPU 6' determines that the attached lens is the AF lens 17.

If the lens attached to the camera body 1' is the AF lens 14', the lens element 27 is not driven in response to the near- or far-focus signal from the CPU 6', so that the focusing state is not changed. The CPU 6' generates the output signal at the terminal P0 thereof, and the switching circuit 30 changes the power source voltage applied to the contact 1a from V2 to V1 in response to the output signal from the terminal P0. The CPU 6' executes the subroutine in FIG. 8.

Figure 11:
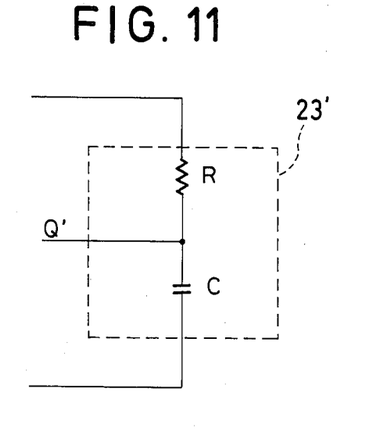
FIG. 11 is an equivalent circuit diagram of the AF lens according to the present invention.

A case will be exemplified wherein the voltage detecting means 23 in the AF lens 14' is replaced with a reset circuit 23' in FIG. 11.

Figure 12:
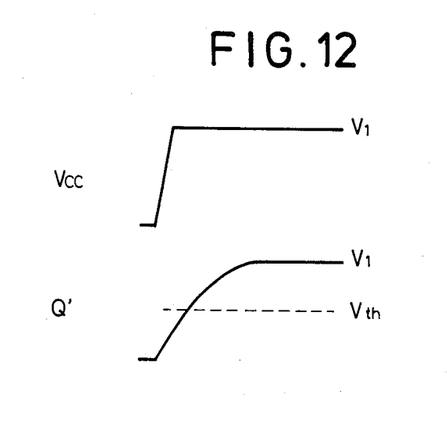
FIGS. 12 and 13 are timing charts for explaining the principle of the AF lens according to the present invention.

In this case, when a power switch SW1 of the camera body 1' is turned on and the first power source voltage V1 is supplied to the power source line (its voltage is represented by Vcc), the voltage Vcc does not immediately reach the first power source voltage V1 due to the presence of the internal resistance of the reset circuit 23', as shown in FIG. 12. In this case, the voltage of an output Q' from the reset circuit 23' having a waveform (FIG. 12) is delayed by a time constant determined by a resistor R and a capacitor C and reaches a threshold voltage Vth. When the output Q' reaches the threshold voltage Vth, the CPU 12' is reset. The threshold voltage Vth slightly varies according to the characteristic of the CPU 12'. The threshold voltage is normally about ½ of the applied voltage.

The level of the threshold voltage Vth is undesirably changed by the level of the power source voltage.

Figure 13:
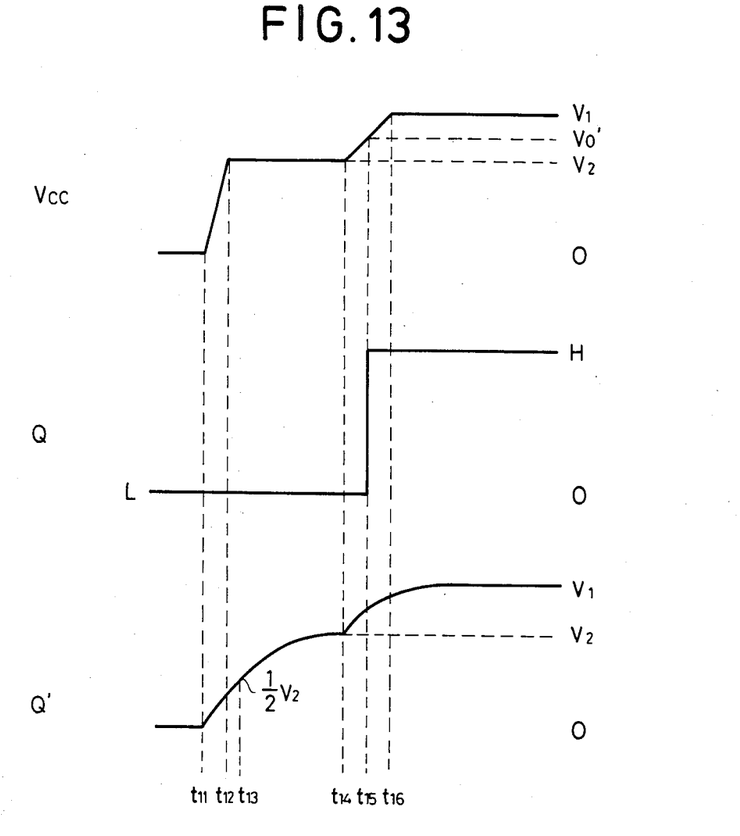

FIG. 13 is a timing chart showing a waveform of the power source voltage Vcc, a waveform of the output Q from the voltage detecting means 23, and a waveform of the output Q' from the reset circuit 23' replacing the voltage detecting means 23 when the AF lens 14' is attached to the camera body 1'.

As shown in FIG. 13, the power source voltage Vcc upon attachment of the AF lens 14' to the camera body 1' is applied from t=t11 and reaches the voltage V2 at time t=t12 due to the presence of the internal resistance. In this case, the camera body 1' identifies the type of the AF lens attached thereto.

If the CPU 6' determines that the attached lens is the AF lens 14', it starts supplying the voltage V2 (t=t12). The power source voltage increases at time t=t14 and reaches the voltage V1 at time t=t16 due to the presence of the internal resistance.

If an AF lens having the reset circuit 23' is attached to the camera body 1' having the CPU 6' operated as described above, the output Q' from the reset circuit 23' is reset when it reaches ½ of the second power source voltage V2 (t=t13). Even if the CPU 6' determines that the attached lens is not the AF lens 17 and the first power source voltage V1 is supplied, a new reset cancel signal is not generated. In addition, the CPU 12' receives noise due to a large change in the power source voltage from V2 to V1. The function of the CPU 12' cannot be guaranteed.

However, in the AF lens 14' having the voltage detecting means 23, when the power source voltage Vcc reaches the reference voltage V0' (t=t15), the output Q of the voltage detecting means 23 goes high, as shown in FIG. 13. The H level output cancels resetting of the CPU 12'. Therefore, the CPU 12' is not subjected to operation failure and can be normally started.

The case exemplified in FIG. 13 is based on the assumption that the power source voltage Vcc has a relatively long rise time. Under this assumption, no delay circuit is arranged. However, if the power source voltage Vcc rises sharply, the delay circuit can be inserted between the reset terminal $\overline{\text{RESET}}$ of the CPU 12' and the voltage detecting means 23.

Figure 3:
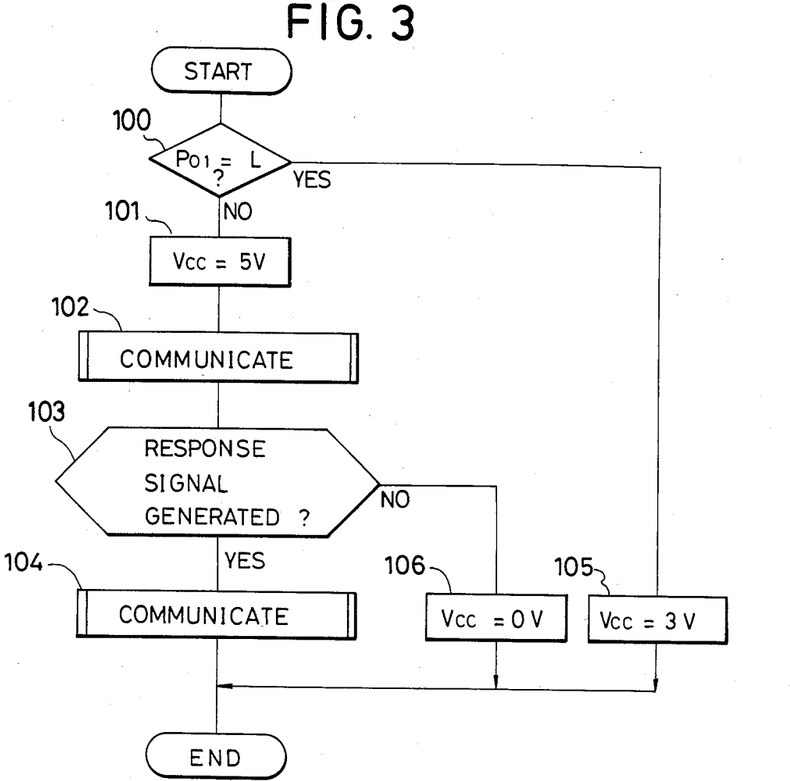
FIG. 3 is a flow chart for explaining the operation of the camera body according to the present invention.

The switching circuit 30 has substantially the same arrangement as in FIG. 3. The switching circuit 30 has two switches for receiving different voltages V1 and V2. The switching operation of the two switches is controlled in response to an output from the terminal P0 from the CPU 6'. A smoothing circuit may be arranged between the output terminals of the two switches and the contact 1a.

Figure 14:
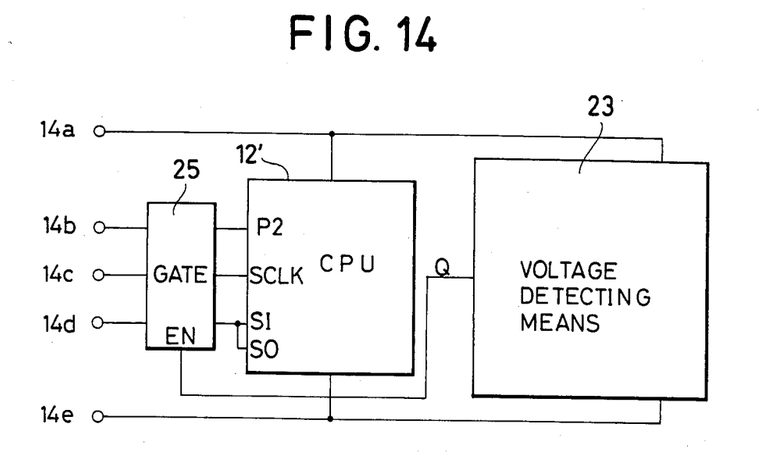
FIGS. 14 and 15 are respectively block diagrams showing improved modifications of the AF lens according to the present invention.
Figure 15:
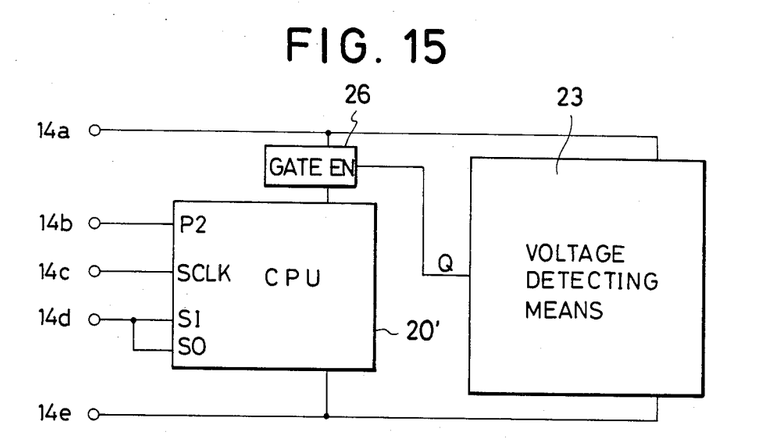

FIGS. 14 and 15 show improved arrangements of the AF lens 14' in FIG. 6. The output Q from the voltage detecting means 23 is input to a gate 25 or 26.

Referring to FIG. 14, the gate 25 is inserted between the plurality of I/O terminals of the CPU 12' and the contacts 14b, 14c, and 14d. A terminal EN of the gate 25 is controlled in response to the output Q from the voltage detecting means 23. More specifically, if the output Q is set at H level, the gate 25 is enabled. However, if the output Q is set at L level, the gate 25 is disabled.

If the power source voltage Vcc does not reach a predetermined value (i.e., the reference voltage V0'), the contacts 14b, 14c, and 14d are electrically disconnected from the CPU 12'. The signals from the contacts 1b, 1c, and 1d are not connected to the contacts 14b, 14c, and 14d, so that no failure occurs.

Referring to FIG. 15, if an input to the terminal EN of the gate 26 is set at H level, the gate 26 transfers to the CPU 12' the power source voltage Vcc supplied through the contact 14a. However, if the input to the terminal EN is L level, the power source voltage is blocked by the gate 26.

In the above embodiments, the present invention is applied to AF lenses. However, the present invention is applicable to an intermediate ring attached to the lens mount of the camera body, a teleconverter, a bellows, and the like.

What is claimed is:

1. A camera body to which a first photographing lens, at least a part of an optical system of which is driven by a motor provided in said first photographing lens, and a second photographing lens with memory means, in which information relative to an optical system of said second photographing lens is stored, are selectively detachably attached, including;
   lens detecting means for generating a first detection signal upon detecting that said first photographing lens is attached to said camera body, and for generating a second detection signal upon detecting that said second photographing lens is attached to said camera body;
   a plurality of terminals for electrical connection with one of said first and second photographing lenses when said one of said first and second photographing lenses is attached to said camera body; and
   producing means responsive to said first detection signal for outputting and first control signal to said first photographing lens through said plurality of terminals, which drives said motor, and responsive to said second detection signal for outputting a second control signal which is different from said first control signal and causes said memory means to transmit said information through at least part of said plurality of terminals to said camera body.

2. A camera body according to claim 1, wherein said memory means outputs a discriminating signal to said at least part of said plurality of terminals when said second photographing lens is attached to said camera body, and wherein said lens detecting means detects which of said first and second photographing lenses is attached to said camera body on the basis of said discriminating signal.

3. A camera body according to claim 2, which further comprises driving means for driving the optical system of said second photographing lens, and wherein said producing means comprises focus detection means for detecting a focus condition of the lens attached to said camera body, said focus detection means producing a driving signal which causes said motor to drive said at least part of said optical system of said first photographing lens when said first photographing lens is attached to said camera body, and producing a focus condition signal on the basis of said information stored in said memory means when said second photographing lens is attached to said camera body, and wherein said driving means drives the optical system of said second photographing lens in response to said focus condition signal.

4. A camera including:
   a camera body;
   a first photographing lens detachable attached to said camera body, said first photographing lens having a circuit; and
   a second photographing lens detachably attached to said camera body, said second photographing lens having another circuit;
   wherein said camera body includes lens detecting means for generating a first detection signal upon detecting that said first photographing lens is attached to said camera body, and for generating a second detection signal upon detecting that said second photographing lens is attached to said camera body, voltage supply means, and control means responsive to said first signal for causing said voltage supply means to supply a first voltage to said circuit and responsive to said second signal for causing said voltage supply means to supply a second volatge, which is different from said first voltage, to said another circuit.

5. A camera according to claim 4, wherein said voltage supply means comprises a terminal and supplies said first and second voltages through said terminal to said circuit and said another circuit.

6. A camera according to claim 5, wherein said control means causes said voltage supply means to supply said first voltage in response to mounting of said first or second photographing lens on said camera body, and wherein said lens detecting means detects which of said first and second photographing lenses is mounted on said camera body after said voltage supply means supplies said first voltage.

7. A camera according to claim 6, wherein said second voltage is higher than said first voltage.

8. A camera comprising:
a camera body;
a first photographing lens detachably attached to said camera body, said first photographing lens having an electrical device;
a second photographing lens detachably attached to said camera body said second photographing lens having another electrical device; and
a third photographing lens detachably attached to said camera body, said third photographing lens having no electrical device;
wherein said camera body includes lens detecting means for detecting which of said first, second and third photographing lenses is mounted on said camera body, voltage supply means, and control means responsive to said lens detecting means for controlling said voltage supply means, said lens detecting means producing a first detection signal indicative to whether said first photographing lens or said second photographing lens is mounted on said camera body, and producing another detection signal indicative of whether said third photographing lens is mounted on said camera body, said control means causing said voltage supply means to supply a first voltage when said first detection signal indicates that said first photographing lens is mounted on said camera body, causing said voltage supply means to supply a second voltage when said first detection signal indicates that said second photographing lens is mounted on said camers body, and inhibiting said voltage supply means in response to said another detection signal.

9. A camera according to claim 8, wherein said first photographing lens has an optical system and said electrical device of said first photographing lens drives at least part of said optical system in response to said first voltage.

10. A camera according to claim 8, wherein said secodn photographing lens has another optical system and wherein said another electrical device has memory means for storing data conforming to the character of said another optical system and transfers said data to said camera body in response to said second voltage.

11. A camera comprising:
a camera body;
a first photographing lens detechably attached to said camera body, said first photographing lens having an electrical device; and
a second photographing lens detachably attached to said camera body, said second photographing lens having no electrical device;
wherein said camera body includes lens detecting means for detecting that said second photographing lens is mountedon said camera body and thereafter producing a detection signal, voltage generating means for generating voltage, and control means responsive to said detection signal for inhibiting said voltage generating means for generating voltage, and wherein said electrical device is enabled to operate in response to the voltage from said voltage generating means.

12. A camera body according to claim 11, wherein said voltage genrating means generates voltages in response to mounting of said first or second photographing lens and said lens detecting means detects whether said second photographing lens is mounted on said camera body after generation of voltage from said voltage generating means.

13. A lens capable of being mounted on a camera body which has a circuit and power supply means, comprising:
a plurality of terminals for electrical connection with said circuit and said power supply means when said lens is mounted on said camera body;
another circuit for receiving a signal from said circuit of said camera body through at least part of said plurality of terminals when said lens is mounted on said camera body;
voltage detecting means for detecting that a value of voltage supplied to said another circuit by said power supply means is above a predetermined value and thereafter producing a detection signal; and
gate means for inhibiting said another circuit from receiving a signal from said circuit of said camera body when said detection signal is not produced, said gate means causing said another circuit to receive the signal from said circuit of said camera body in response to said detection signal.

14. A lens according to claim 13, wherein said another circuit is enabled to operate normally when the value of voltage supplied to and another circuit by said power supply means is above said predetermined value.

15. A lens according to claim 13, wherein said gate means is connected between said another circuit and said at least part of said plurality of terminals, which transmit said signal to said another circuit when said lens is mounted on said camera body, and wherein said gate means controls an electrical connection between said at least part of said plurality of terminals and said another circuit in response to said detection signal.

16. A lens according to claim 13, wherein said gate means is connected between said another circuit and at least part of said plurality of terminals, which supply power to said another circuit from said power supply means when said lens is mounted on said camera body, and wherein said gate means controls an electrical connection between said part of said plurality of terminals and said another circuit in response to said detection signal.

17. A lens according to claim 13, wherein said another circuit has memory means for storing data relative to an optical system of said lens, and wherein said another circuit is enabled to output said data to said circuit of said camera body through said at least part of said plurality of terminals when said value of voltage is supplied to said another circuit by said power supply means.

18. A lens capable of being mounted on a camera body which has a circuit and power supply means, comprising:
a plurality of terminals for electrical connection with said circuit and said power supply means when said lens is mounted on said camera body;
voltage detecting means for detecting that a value of voltage supplied to two of said plurality of terminals by said power supply means is above a predetermined value and thereafter producing a detection signal;
another circuit for electrical connection with said two of said plurality of terminals; and
control means for inhibiting said another circuit from operating when said detection signal is not produced, said control means causing said another circuit to operate in response to said detection signal.

19. A lens capable of being mounted on a camera body which has a circuit and power supply means, comprising:
    a plurality of terminals for electrical connection with said circuit and said power means when said lens is mounted on said camera body;
    another circuit for electrical connection with at least two of said plurality of terminals;
    and voltag detecting means for detecting that a value of voltage supplied by said power supply means is above a predetermined value and thereafter producing a detection signal which causes said another circuit to operate.

20. A camera body to which a first photographing lens with a first electrical circuit and a second photographing lens with another electrical circuit are selectively detachably attached, including:
    lens detecting means for generating a first etection signal upon detecting that said first hotographing lens is attached to said camera body, and or generating a second detection signal upon detecting hat said second photographing lens is attached to said camera body;
    a plurality of terminals for electrical connection with one of said first and second photographing lenses when said one of said first and second photographing lenses is attached to said camera body; and
    producing means responsive to said first detection signal for outputting a first control signal to said first photographing lens through said plurality of terminals, which drives said first electrical circuit, and responsive to said second detection signal for outputting a second control signal to said second photographing lens, which is different from said first control signal and drives said another electrical circuit through at least part of said plurality of terminals.

* * * * *